(12) United States Patent
Lisseman et al.

(10) Patent No.: US 11,032,875 B2
(45) Date of Patent: Jun. 8, 2021

(54) SYSTEMS AND METHODS FOR HEATING AND SENSING PROXIMITY TO VEHICLE COMPONENTS

(71) Applicant: Joyson Safety Systems Acquisition LLC, Auburn Hills, MI (US)

(72) Inventors: Jason Lisseman, Shelby Township, MI (US); Blaine Dolcetti, Oxford, MI (US); Valerie D. Gardner, Shelby Township, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 203 days.

(21) Appl. No.: 15/980,608

(22) Filed: May 15, 2018

(65) Prior Publication Data
US 2018/0332663 A1    Nov. 15, 2018

Related U.S. Application Data

(60) Provisional application No. 62/506,477, filed on May 15, 2017.

(51) Int. Cl.
*H05B 1/02* (2006.01)
*H05B 3/34* (2006.01)
(Continued)

(52) U.S. Cl.
CPC ......... *H05B 1/0238* (2013.01); *B60N 2/002* (2013.01); *B60N 2/5678* (2013.01);
(Continued)

(58) Field of Classification Search
None
See application file for complete search history.

(56) References Cited

U.S. PATENT DOCUMENTS

| 6,172,342 B1* | 1/2001 | Khafagy | B60H 1/00292 |
| | | | 219/202 |
| 6,184,501 B1* | 2/2001 | Zapf | H05B 3/746 |
| | | | 219/447.1 |

(Continued)

OTHER PUBLICATIONS

Notification of Transmittal of the International Search Report and the Written Opinion of the International Searching Authority, or the Declaration, dated Sep. 13, 2018,11.

(Continued)

*Primary Examiner* — Joseph M. Pelham
(74) *Attorney, Agent, or Firm* — Meunier Carlin & Curfman LLC

(57) ABSTRACT

Various implementations include a vehicle component heating system that includes an electrode disposed within a sensing zone, and a processor. The electrode generates heat for a surface of a vehicle component within the sensing zone and senses proximity of an occupant to the sensing zone. The processor selects a heating percentage of a duty cycle for generating a heating signal, a sensing percentage of the duty cycle for generating and measuring a sensing signal and reporting the measured sensing signal, and an idle percentage of the duty cycle during which neither the heating nor the sensing signal is generated, wherein the sum of the heating, sensing, and idle percentages is 100%. The processor generates the heating signal and/or generates and measures the sensing signal and reports the measurement of the sensing signal based on the selected percentages.

18 Claims, 9 Drawing Sheets

(51) Int. Cl.
  *B62D 1/04* (2006.01)
  *B62D 1/06* (2006.01)
  *G01V 3/38* (2006.01)
  *B60N 2/56* (2006.01)
  *G01K 3/00* (2006.01)
  *G01K 7/16* (2006.01)
  *B60N 2/00* (2006.01)

(52) U.S. Cl.
  CPC ........... *B60N 2/5685* (2013.01); *B62D 1/046* (2013.01); *B62D 1/065* (2013.01); *G01K 3/005* (2013.01); *G01K 7/16* (2013.01); *G01V 3/38* (2013.01); *H05B 3/34* (2013.01); *H05B 3/342* (2013.01); *H05B 2203/029* (2013.01)

(56) References Cited

U.S. PATENT DOCUMENTS

| | | | |
|---|---|---|---|
| 6,614,006 B2 * | 9/2003 | Pastore | H05B 3/746 219/447.1 |
| 7,521,940 B2 | 4/2009 | Koch et al. | |
| 8,725,230 B2 | 5/2014 | Lisseman et al. | |
| 8,841,929 B2 | 9/2014 | Bennett et al. | |
| 8,983,732 B2 | 3/2015 | Lisseman et al. | |
| 9,248,851 B2 | 2/2016 | Van Tzelfde et al. | |
| 9,346,480 B2 | 5/2016 | Maguire et al. | |
| 10,076,982 B2 * | 9/2018 | Barfuss | B60N 2/5685 |
| 2001/0023868 A1 * | 9/2001 | Aurre | H05B 3/746 219/518 |
| 2001/0045733 A1 * | 11/2001 | Stanley | B60N 2/5685 280/735 |
| 2002/0033389 A1 * | 3/2002 | Sugiyama | B62D 1/065 219/204 |
| 2002/0170900 A1 * | 11/2002 | Braeuchle | B62D 51/002 219/204 |
| 2005/0085968 A1 * | 4/2005 | Panic | B60N 2/56 701/36 |
| 2005/0242965 A1 | 11/2005 | Rieth et al. | |
| 2007/0192007 A1 | 8/2007 | Stanley et al. | |
| 2007/0208529 A1 | 9/2007 | Koch et al. | |
| 2008/0011732 A1 * | 1/2008 | Ito | B60N 2/002 219/217 |
| 2010/0038351 A1 * | 2/2010 | Tabaczynski | B60L 1/08 219/202 |
| 2010/0071502 A1 * | 3/2010 | Yasuda | B62D 1/065 74/552 |
| 2012/0312796 A1 * | 12/2012 | Cho | H05B 3/34 219/204 |
| 2012/0326735 A1 * | 12/2012 | Bennett | B62D 1/046 324/705 |
| 2013/0092677 A1 * | 4/2013 | Virnich | B60R 21/015 219/204 |
| 2013/0098890 A1 * | 4/2013 | Virnich | B60N 2/002 219/204 |
| 2013/0334196 A1 | 12/2013 | Lamesh et al. | |
| 2014/0110388 A1 * | 4/2014 | Fassbender | B62D 1/065 219/204 |
| 2014/0151356 A1 | 6/2014 | Maguire et al. | |
| 2014/0339211 A1 * | 11/2014 | Barfuss | H05B 1/0236 219/202 |
| 2015/0028015 A1 * | 1/2015 | Park | B62D 1/065 219/204 |
| 2015/0102024 A1 | 4/2015 | Barfuss et al. | |
| 2015/0298590 A1 | 10/2015 | Lamesch et al. | |
| 2015/0336601 A1 * | 11/2015 | Van'tZelfde | H03K 17/962 219/204 |
| 2016/0096543 A1 | 4/2016 | Naitou et al. | |
| 2017/0014078 A1 | 1/2017 | Yamazak et al. | |
| 2018/0257457 A1 * | 9/2018 | Olson | B60N 2/5685 |

OTHER PUBLICATIONS

European Search Report Issued in EP Application No. 18801709.9; dated Nov. 27, 2020; 9 pages.

* cited by examiner

SYSTEMS AND METHODS FOR HEATING AND SENSING PROXIMITY TO VEHICLE COMPONENTS

CROSS REFERENCE TO PRIOR APPLICATIONS

This application claims priority to and incorporates entirely by reference U.S. Provisional Patent Application Ser. No. 62/506,477 filed on May 15, 2017, and entitled "Systems and Methods for Heating and Sensing Proximity to Vehicle Components."

BACKGROUND

In colder regions of the world, during colder months, it may be desirable to provide a vehicle with heating elements in particular locations (e.g., a vehicle seat, a vehicle steering wheel, etc.) that a vehicle occupant contacts, so as to provide warmth to the occupant and improve the occupant's driving experience. Difficulties may arise when trying to design an occupant sensor system that uses electrodes to sense a presence of an occupant that is in relative close proximity to a heating element configured to provide warmth to the occupant. For example, without a shield layer positioned between the electrode and the heating element, the electrical coupling between the electrode and the heating element may be greater than the electrical coupling between a vehicle occupant and the electrode. As a result, the presence of the occupant may not be reliably determined by the electrode.

Thus, improved systems and methods for sensing proximity to vehicle components, such as seats and steering wheels, are needed in the art.

SUMMARY

Various implementations include a vehicle component heating system that includes a computer, at least one electrode, and a processor. The computer controls an electrical power source defining a duty cycle for an electrical power signal, and the electrical power signal comprises a heating signal, a sensing signal, and an idle period within the duty cycle during which neither a heating signal nor a sensing signal is generated. The at least one electrode is connected to the electrical power source and is disposed within a sensing zone of a vehicle component. The electrode is for generating heat for a surface of the vehicle component within the sensing zone in response to receiving the heating signal and for sensing proximity of a vehicle occupant to the sensing zone in response to receiving the sensing signal. The processor is connected to the computer and is in electrical communication with a memory, the electrode, and at least one vehicle control system. The memory stores instructions for controlling the processor, and the instructions cause the processor to: (1) receive at least one input signal from the at least one vehicle control system; (2) based on the at least one input signal from the at least one vehicle control system, select a heating percentage of the duty cycle for generating the heating signal, a sensing percentage of the duty cycle for generating and measuring the sensing signal and reporting the sensing signal measured, and an idle percentage of the duty cycle during which no heating signal or sensing signal is generated, wherein a sum of the heating, sensing, and idle percentages is 100%; and (3) generate the heating signal and/or generate and measure the sensing signal and report the sensing signal measured based on the selected percentages.

In some implementations, the instructions further cause the processor to select a duty cycle duration based on the at least one input signal from the at least one vehicle control system, and generating the heating signal and/or generating and measuring the sensing signal is further based on the selected duty cycle duration.

In some implementations, the selection of the duty cycle duration and/or the percentages of the duty cycle are based on whether the reported sensing signal measurement indicates a change in presence or absence from the sensing zone.

In some implementations, the duty cycle duration decreases and/or the sensing percentage increases in response to the reported sensing signal measurement indicating the change in presence or absence from the sensing zone. And, in some implementations, the duty cycle duration increases and/or the heating percentage increases in response to the sensing signal indicating no change in presence or absence from the sensing zone and a temperature of the surface is below a goal temperature.

In some implementations, the heating percentage decreases as a temperature of the surface of the vehicle component approaches the threshold temperature.

In some implementations, the heating percentage is lower than the sensing percentage in response to the at least one input signal received from the at least one vehicle control system indicating that an occupant is adjacent the sensing zone and a temperature of the surface of the vehicle component is at or above a threshold temperature and below a goal temperature, wherein the threshold temperature is less than the goal temperature.

In some implementations, the percentages and/or duty cycle duration are selected based on a rate of heating goal for the surface of the vehicle component.

In some implementations, the at least one input signal comprises an input indicating a change in a door open/closed condition.

In some implementations, the at least one input signal comprises an input indicating a change in a seat belt buckled/unbuckled condition.

In some implementations, the at least one input signal comprises an input indicating a change in a power on/off condition of the vehicle.

In some implementations, the at least one input signal comprises a vehicle speed input that indicates a speed at which the vehicle is traveling.

In some implementations, the at least one input signal comprises an input from a camera-based monitoring system indicating occupant presence/absence within the vehicle.

In some implementations, the at least one input signal comprises an input indicating a change in a steering column position.

In some implementations, the at least one input signal comprises an input from an ignition switch, and the input from the ignition switch indicates a change in an ignition switch condition.

In some implementations, the change in the ignition switch condition comprises changing among an on condition, an off condition, an accessory mode condition, or a crank condition.

In some implementations, the at least one input signal comprises an input indicating a change in seat position.

In some implementations, the at least one input signal comprises an input indicating depression of a brake pedal.

In some implementations, the at least one input signal comprises an input indicating that the vehicle is in autonomous or semi-autonomous driving mode.

In some implementations, the at least one input signal comprises an input indicating that a power on/off condition of the vehicle has been changed remotely.

In some implementations, the at least one input signal comprises an input indicating that a parking assist system has been activated.

In some implementations, the at least one input signal comprises an input from a vehicle to vehicle (V2V) communication system.

In some implementations, the at least one input signal comprises an input from a Vehicle-to-Infrastructure (V2I) communication system.

In some implementations, the at least one input signal comprises an input indicating that power for the vehicle has been turned on or off remotely.

In some implementations, the electrode is disposed in a steering wheel.

In some implementations, the electrode is disposed in a seat.

In some implementations, the sensing zone is a first sensing zone and the electrode is a first electrode, and the system further includes a second electrode that is spaced apart from the first electrode. The second electrode is within a second sensing zone that is spaced apart from the first sensing zone.

In some implementations, the first and second electrodes are disposed on a surface of a substrate.

In some implementations, the electrode is a first electrode and the system further includes a second electrode disposed between the first electrode and a frame of the vehicle component. The second electrode is in electrical communication with the processor, and the instructions cause the processor to generate a shielding signal for communicating to the second electrode. The shielding signal reduces parasitic capacitance between the first electrode and the frame of the vehicle component.

In some implementations, the instructions further cause the processor to receive a sensing duration value indicating time elapsed between consecutive changes in the reported sensing signal measurement indicating proximity to the sensing zone, and wherein the selection of the duty cycle and/or percentages of the duty cycle are further based on the sensing duration value.

In various other implementations, a vehicle component heating system may include a computer, at least one electrode, and a processor. The computer controls an electrical power source defining a duty cycle for an electrical power signal, the electrical power signal including a heating signal, a sensing signal, and an idle period within the duty cycle during which no signal is generated. The at least one electrode is connected to the electrical power source and is disposed within a sensing zone of a vehicle component. The at least one electrode receives the electrical power signal from the electrical power source. The electrode generates heat for a surface of the vehicle component within the sensing zone in response to receiving the heating signal and senses proximity of a vehicle occupant to the sensing zone in response to receiving the sensing signal. The processor is connected to the computer and is in electrical communication with the electrical power source, a memory, the electrode, and at least one vehicle control system. The memory stores instructions for controlling the processor, and the instructions cause the processor to (1) receive a sensing duration value indicating elapsed time between consecutive changes in the sensing signal from the electrode and indicating proximity to the sensing zone; (2) based on the sensing duration value received, select a heating percentage of the duty cycle for generating the heating signal, a sensing percentage of the duty cycle for generating and measuring the sensing signal and reporting the measured sensing signal to the memory, and an idle percentage of the duty cycle during which no signal is generated, wherein the sum of the heating, sensing, and idle percentages is 100%; (3) configure the power source to generate the heating signal and/or the sensing signal according to the selected percentages; and (4) measure the sensing signal and report the sensing signal measured based on the selected percentages.

BRIEF DESCRIPTION OF THE DRAWINGS

Features, aspects, and advantages of the present invention will become apparent from the following description and the accompanying example implementations shown in the drawings, which are briefly described below.

DETAILED DESCRIPTION

It is to be understood that both the foregoing general description and the following detailed description are examples and explanatory only.

Implementations of this disclosure refer to a duty cycle of an electrical power signal generated by an electrical power source, such as, but not limited to a battery subject to computerized control algorithms discussed herein. In one non-limiting example, an electronic control unit or a computer may control the electrical power source (illustrated as a voltage source in FIGS. 3-5) and be connected to the below-described processors and memory storing relevant software to implement the features of the various implementations. In traditional terms, a duty cycle refers to that percentage of a signal period in which the subject signal has a magnitude other than zero (i.e., when the signal is active). Accordingly, the term "duty cycle" is often, but not always, considered for signals generated at a particular frequency. This disclosure, however, not only includes standard definitions for the term "duty cycle" but also refers to broader considerations. For example, a duty cycle as discussed herein may be composed of percentages of an input electrical power signal that make up one hundred percent (100%) of a defined cycle of that power signal. The defined cycle may include all desired sequences of any respective magnitudes (including zero magnitude idle periods and any offset voltages) that together define the electrical power signal's duty cycle duration before the electrical power signal cycle starts over. In one non-limiting example, the duty cycle of the electrical power signal includes respective percentages for a heating signal, an idle time, and a sensing signal, which make up the electrical power signal.

Figure 10:
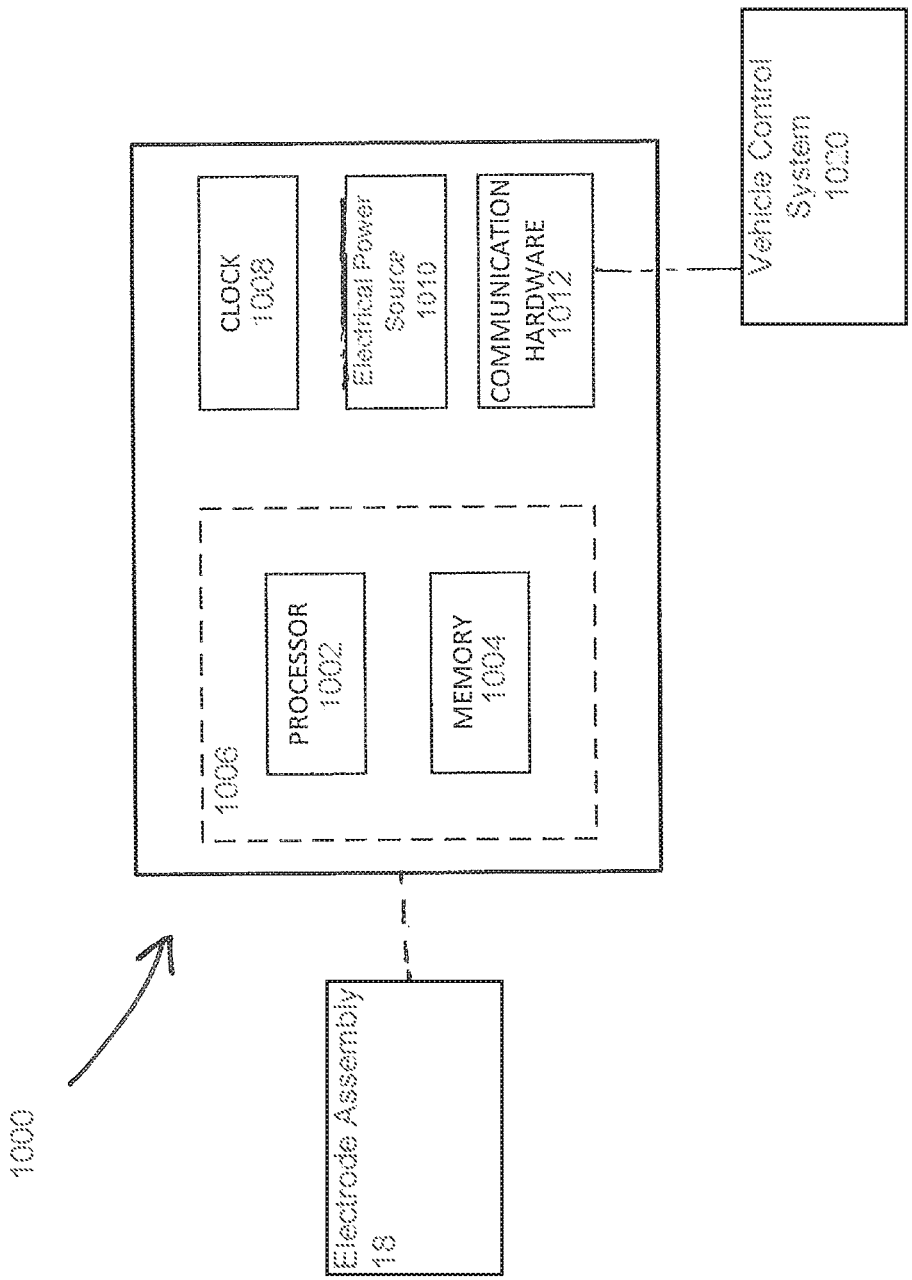
FIG. 10 is a schematic view of a vehicle component heating system configured to implement computerized instructions of FIG. 6 and FIG. 7.

The vehicle component heating system shown in FIG. 10 includes a computer 1000, at least one electrode 18, and a processor 1002. The computer 1000 controls an electrical power source 1010 defining a duty cycle for an electrical power signal. The electrical power signal includes a heating signal, a sensing signal, and an idle period within the duty cycle during which neither a heating nor a sensing signal is generated. In some implementations, no signal may be generated during the idle period. The at least one electrode 18 is connected to the electrical power source 1010 and is disposed within a sensing zone of a vehicle component. The electrode 18 generates heat for a surface of the vehicle component within the sensing zone in response to receiving a heating signal and senses proximity of a vehicle occupant to the sensing zone in response to receiving a sensing signal. The system further includes a processor 1002 connected to the computer 1000 and in electrical communication with a memory 1004, the electrode 18, and at least one vehicle control system 1020. The memory 1004 stores instructions for controlling the processor 1002, and the instructions cause the processor 1002 to: (1) receive at least one input signal from the at least one vehicle control system 1020 and/or a sensing duration value indicating an elapsed time between consecutive changes in the sensing signal from the electrode 18 and indicating proximity to the sensing zone; (2) select a heating percentage of a duty cycle for generating the heating signal, a sensing percentage of the duty cycle for generating the sensing signal, an idle percentage of the duty cycle during which no heating or sensing signals are generated, and/or a duty cycle duration, wherein the sum of the heating, sensing, and idle percentages is 100%; and (3) generate the heating signal and/or the generate and measure the sensing signal and report the sensing signal measured based on the selected percentages. In some implementations, the instructions also cause the processor 1002 to configure the power source 1010 to generate the heating and/or sensing signals and measure the sensing signal and report the sensing signal measured according to the selected percentages. The computer 1000 may further include clock 1008 and communication hardware 1012. And, the processor 1002 and memory 1004 are components of electronic controller 1006 as shown in FIG. 10, which, in some implementations, is a component of computer 1000.

Similar to the occupant detection systems disclosed in U.S. Published Application Nos. 2007/0192007 and 2014/0151356, the sensing circuit (e.g., the ASIC) could be designed to provide data relating to the change in the complex impedance to detect that an occupant's hand is proximate to a steering wheel or that the occupant's body is proximate to another vehicle component (e.g., a seat). Also, the operation of the heating system could employ the methodology and structural features disclosed in U.S. Pat. No. 7,521,940. These applications and this patent are incorporated by reference herein.

Figure 1:
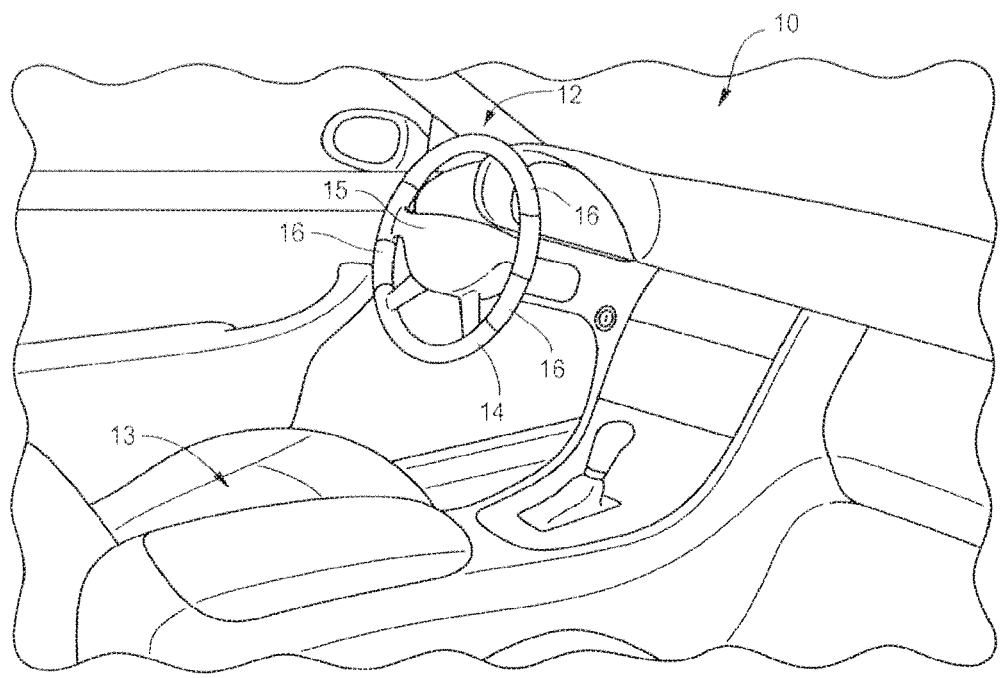
FIG. 1 is a perspective view of a vehicle interior.

FIG. 1 illustrates an example view of a cockpit of a vehicle cabin. Referring to FIG. 1, a vehicle driver may operate a vehicle from the cockpit (vehicle interior) 10 with a steering wheel 12 and a vehicle seat (e.g., the driver's seat 13). When sitting on the driver's seat 13, the driver may rotate the steering wheel 12 to turn the vehicle wheels and steer the vehicle in a desired direction. The steering wheel 12 may also include various controls in the form of switches or buttons provided within easy reach of the driver, such as controls for a vehicle audio system (e.g., volume, tuning, mode, etc.), controls for vehicle lighting (e.g., overhead lighting, headlights, etc.), phone controls, cruise control, or other suitable control. It should be understood by those skilled in the art that the steering wheel 12 may include any combination of the controls disclosed herein, according to various example implementations, and that these configurations are not intended to limit the possible arrangements of controls provided on the steering wheel 12. For example, elements used in one example implementation may be used in various combinations with elements used in another example implementation.

Figure 2:
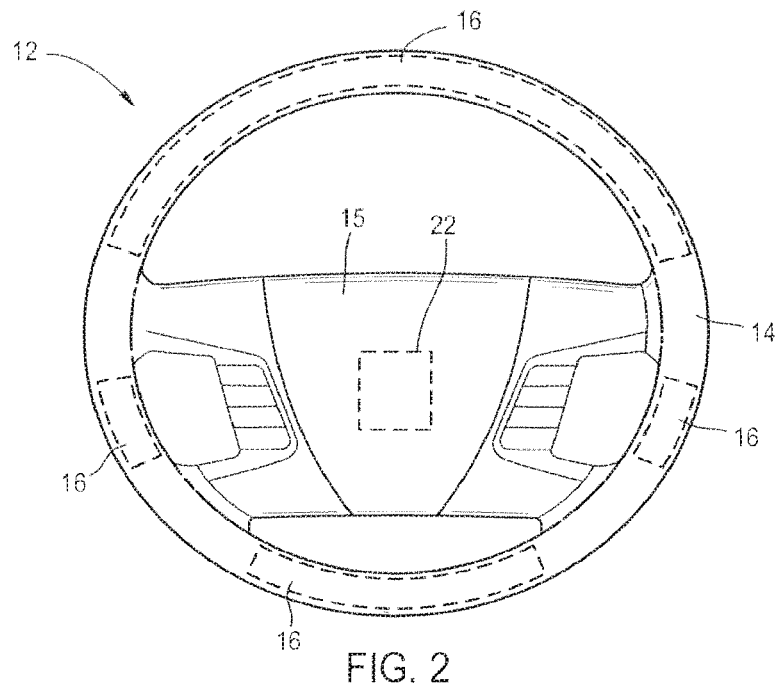
FIG. 2 is a schematic front view of a steering wheel including an occupant sensing system which includes a plurality of heater zones, according to an example implementation.

FIG. 2 illustrates an example steering wheel 12 having a plurality of sensor/heater zones 16. The steering wheel 12 includes a ring-like outer portion 14, or rim, and an inner portion 15, or hub, coupled to a steering column of the vehicle. The outer portion 14 may be formed of a rigid frame or armature, which may be partially or fully covered by an outer layer (e.g., a skin, covering, wrap, etc.). The outer layer may be configured to provide an aesthetically pleasing exterior for the steering wheel 12 and add an ergonomically pleasing layer (i.e., such that the skin improves the ergonomics, feel, grip, etc. of the steering wheel 12) to an outer surface of the steering wheel 12. Although a particular steering wheel is described herein, it should be readily understood that a steering wheel system according to the example implementations disclosed herein may have any suitable configuration, and that the particular outer and inner portions are not limiting.

Further, the outer portion 14 of the steering wheel 12 includes one or more sensor/heater zones 16. The sensor/heater zones 16 are selectively activatable to warm the hands of the driver or sense proximity of the hands to the respective sensor/heater zone 16. It should be understood that the number, location, and configuration of the sensor/heater zones 16 shown in the figures are examples and are not intended to limit the possible various configurations of sensor/heater zones provided on a steering wheel. For example, the steering wheel 12 may include one or more electrodes 18 to provide one or more corresponding sensor/heater zones 16. The sensor/heater zones 16 may be provided in any suitable place on the steering wheel 12 (e.g., along the outer portion 14 or on the inner portion 15). And, as noted above, the sensor/heater zones 16 may be provided in any suitable place on another vehicle component, such as seat 13.

Figure 3:
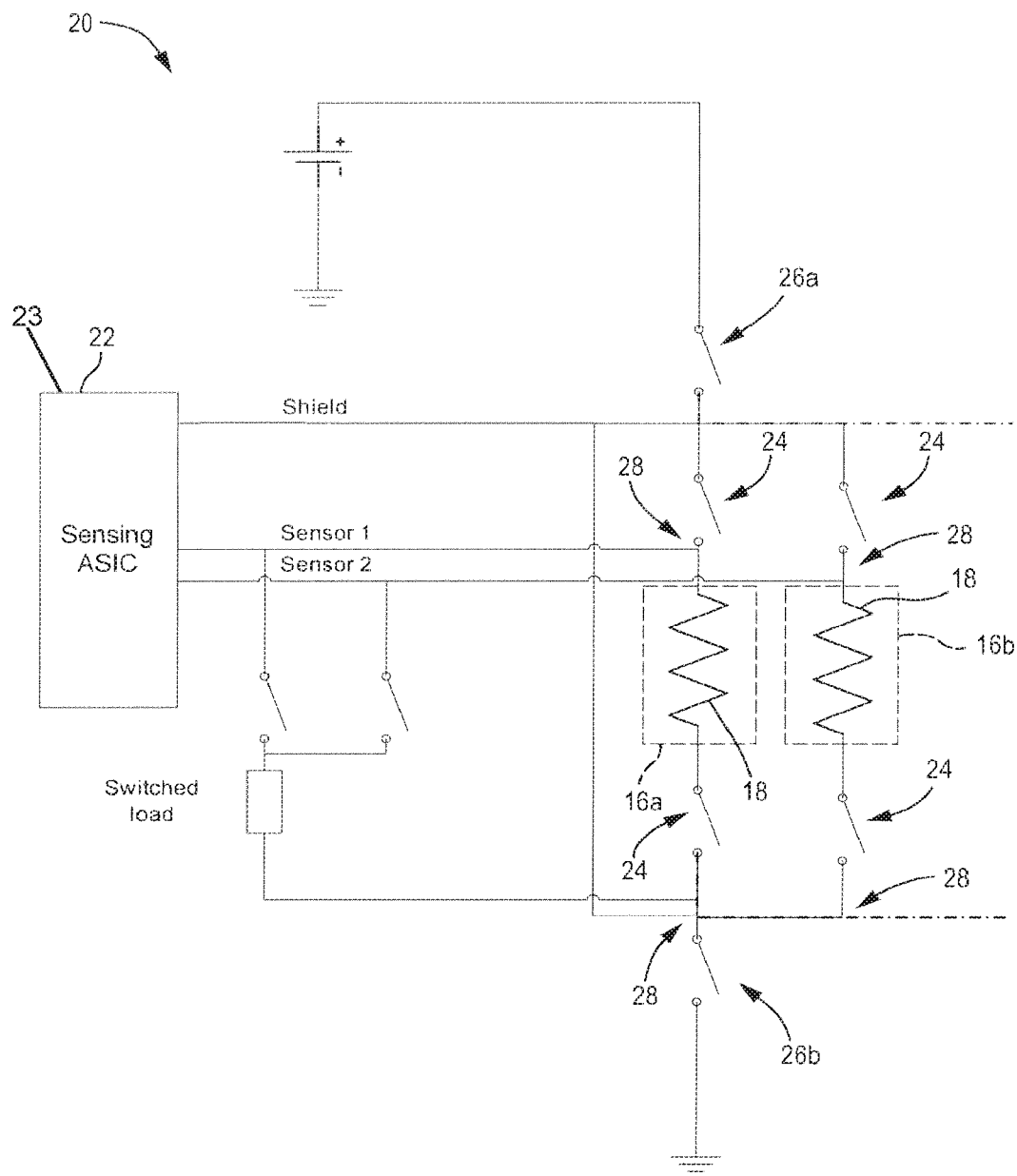
FIG. 3 is a schematic diagram of an occupant sensing system having a parallel configuration.

FIG. 3 illustrates a schematic diagram of a vehicle component heating system 20 according to one implementation. The system 20 includes an electrode 18 (e.g., a heating element), which is disposed within each sensor/heater zone 16. The system 20 may include any suitable number of such electrodes positioned within any suitable number of sensor/heater zones. The electrode 18 may be used to provide warmth for a vehicle occupant when a heating signal is supplied to the electrode (e.g., the electrode may generate heat that is transferred to the occupant's hands). Further, the electrode 18 may be used to determine the proximity of a hand of an occupant of the vehicle to the sensing zone when a sensing signal is supplied to the electrode 18. The heating signal may carry a higher current relative to the sensing signal. In this manner, the electrode 18 is cooperatively configured to be used as a sensor and a heater. Thus, the electrode 18 may alleviate the costs and the packaging difficulties associated with adding a separate sensor and shield over a top of a heating element for a heater zone.

The electrode 18 may be coupled to a vehicle power supply (e.g., the vehicle's DC bus which may be supplied power by a batter or alternator, for example). Further, the vehicle power supply may be used to supply the heating signal to the electrode. The system 20 may further include a variety of controls, sensors, and other elements used to control or regulate the heating signal, so as to control the temperature of the heater zone (so the vehicle component being heated (e.g., a steering wheel 12 or seat 13) does not overheat).

According to an example implementation, an electronic controller, or processor, of system 20 controls whether the sensing signal, the heating signal, or no signal is supplied to the electrode 18. In one example implementation, a computer controlled voltage is applied to the electrode 18 as an electric power signal from an electric power source to achieve the purposes of this disclosure, and an application of each signal supplied based on the proximity of the occupant's body to a sensor/heater zone 16. For example, according to an example implementation in which the electrode 18 is disposed within a sensor/heater zone 16 of steering wheel 12, the controller may not supply the heating signal to the electrode 18 until or unless a hand is detected in proximity to the sensor/heater zone 16. In other words, the system 20 may be configured to automatically supply a heating signal to the electrode 18 when a body part is sensed to be proximate to the sensor/heater zone 16.

According to an example implementation, the controller supplies the heating signal and the sensing signal to the electrode 18 on an alternating basis at a pre-determined time interval. Further, the heating and sensing signals may be time-multiplexed between multiple electrodes, according to how multiple electrodes are arranged in the system 20 (e.g., whether multiple electrodes are arranged in parallel or series).

The system 20 may include a variety of solid state components positioned in-line with the electrode 18. The solid state components switch between a high impedance in a sensing mode and a low impedance in a heating mode. The solid-state components may include, but are not limited to, transistors, such as MOSFETS, that can be configured as high side drivers and low side drivers. The solid state components may have any suitable impedance at the sensing frequency in the sensing mode and at the heating frequency in the heating mode. A switch load may be used in the sensing mode to calibrate the electrode. According to an example implementation, a driven shield signal may be imposed to shield a sensing signal from the inductors. Further, a multi-measurement approach may be utilized which may involve applying multiple driven shield signal levels to the shielded nodes and switching in impedance between the sensor and shield nodes. In this way, an error caused by (e.g., resulting from, attributed to, etc.) the configuration of inductors (e.g., the measurement architecture) may be reduced, cancelled, lessened, etc.

Figure 4:
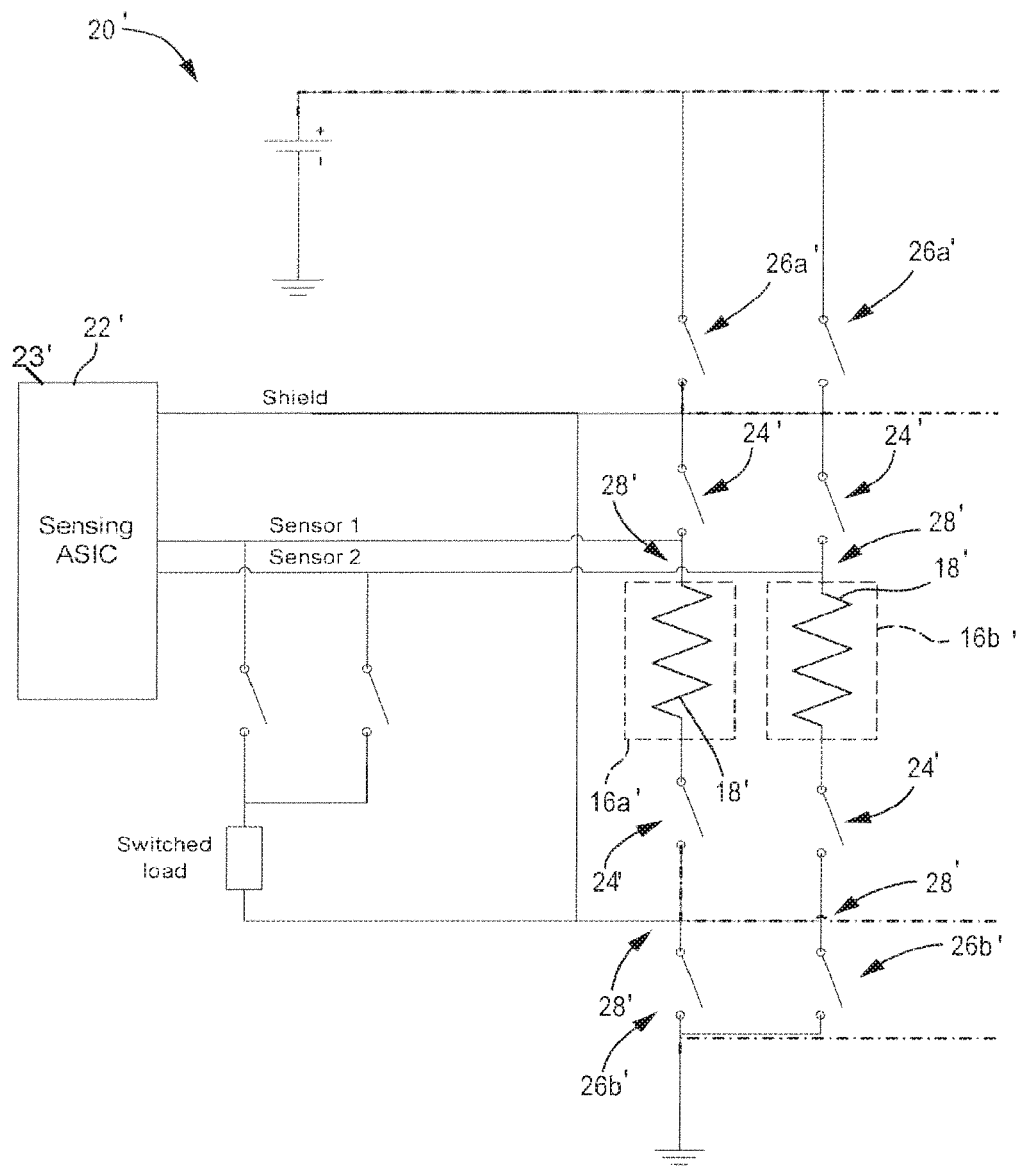
FIG. 4 is a schematic diagram of an occupant sensing system having another parallel configuration.
Figure 5:
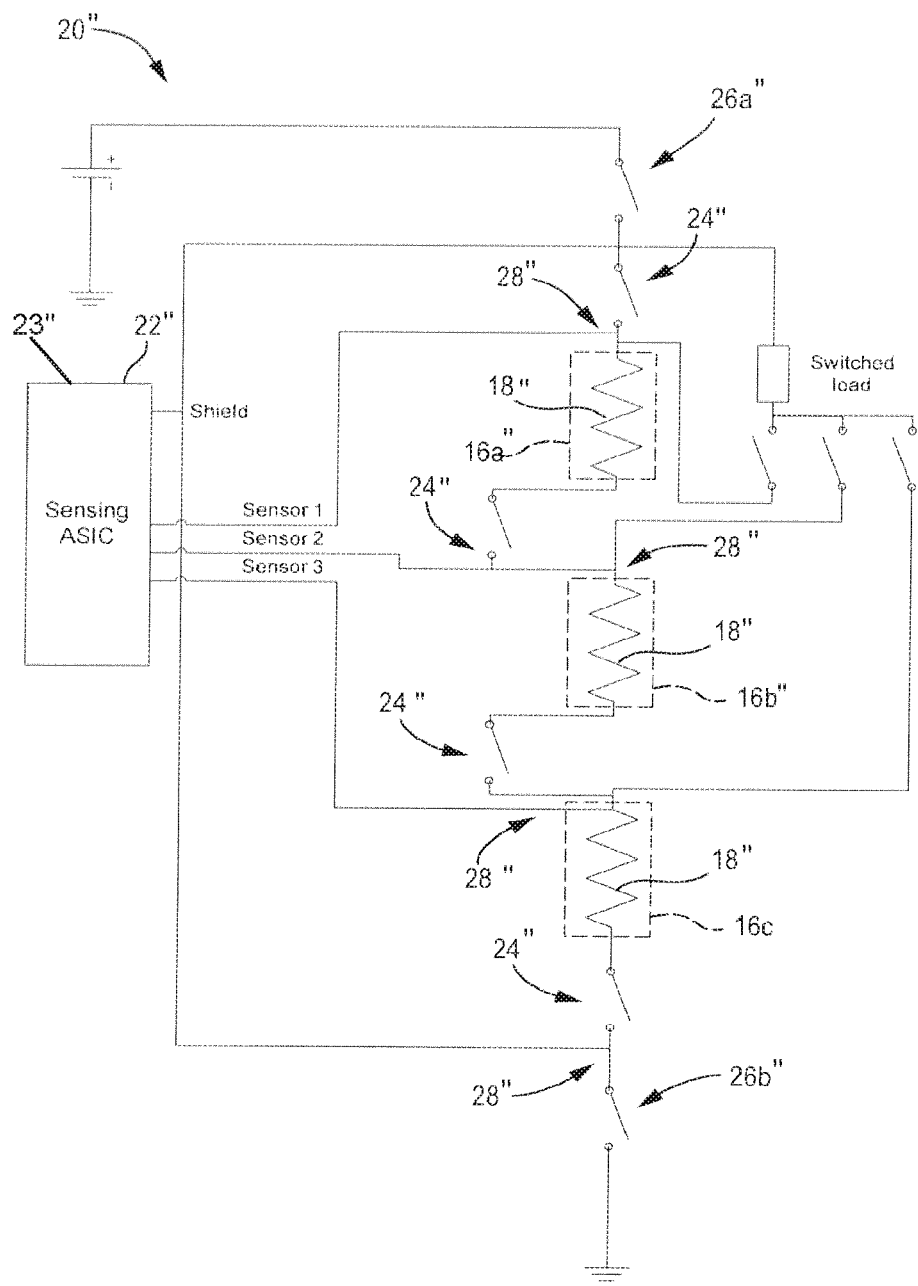
FIG. 5 is a schematic diagram of an occupant sensing system having a series configuration.

FIGS. 3-5 illustrate various architectural examples of system 20. The examples include the high-side and low-side MOSFETs and other solid state switching components, which are shown as switches 26a, 26b, respectively. Further, the system 20 includes high current switches 24 as an additional impedance source or inductor between the switches 26 for the electrodes 18 and the sensing nodes 28. However, as described above, in alternative example implementations, an impedance source is not limited to any particular solid state switching components and may include other FETs or any other suitable element having an appropriate impedance.

With reference to FIG. 3, the system 20 is shown as having a parallel heating setup in which the sensing and heating is time multiplexed. As shown in FIG. 3, the system 20 may include a high-side switch 26a and a low-side switch 26b for multiple heater zones 16a, 16b. Such a parallel heating setup may reduce the complexity and cost of the system 20. Further, each sensor/heater zone 16a, 16b may include an isolation impedance source (i.e., an inductor), shown as switch 24, on either side of the electrode 18. As shown in FIG. 3, the system 20 may be configured to sense the presence of a vehicle occupant when heating is off for all sensor/heater zones 16a, 16b. It should be understood by those skilled in the art that, although two sensor/heater zones 16a, 16b are shown in FIG. 3, the system 20 could be configured to include any number of sensor/heater zones.

Referring now to FIG. 4, the system 20' may include a parallel heating setup in which an occupant sensing function and a heating function are time-multiplexed for individual sensing/heating zones. For example, the system 20' shown in FIG. 4 is configured to simultaneously sense the presence of an occupant in a first sensor/heater zone 16a' and/or provide warmth/heat in a second sensor/heater zone 16b'. After a specified period of time, the first and second sensor/heater zones 16a', 16b' may alternate (i.e., switch) functions, such that the system 20' is configured to simultaneously sense the presence of an occupant in the second sensor/heater zone 16b' and provide warmth/heat in the first sensor/heater zone 16a'. A high-side switch 26a' and a low-side switch 26b' is provided for each of the sensor/heater zones 16a, 16b'. It should be understood by those skilled in the art that, although two sensor/heater zones 16' are shown in FIG. 4, the system 20' could be configured to include any number of sensor/heater zones.

Referring now to FIG. 5, the system 20" may include a series heating setup in which an occupant sensing function and a heating function are time-multiplexed. The system 20", as shown in FIG. 5, may include appropriate solid state switches, including but not limited to, a high-side switch 26a" and a low-side switch 26b". Further, the sensor system 20" shown in FIG. 5 may include less isolation impedance sources (e.g., switches 24") when compared to a parallel design (e.g., as described above and shown in FIGS. 3-4). Thus, the cost of a system (e.g., system 20") having a series design may be less than a system (e.g., system 20, 20') having a parallel design. Further, as shown in FIG. 5, the sensor system 20" having a series design may sense the presence of an occupant in a single sensor/heater zone 16" if a heating function for each heater zone 16" is off. It should be understood by those skilled in the art that, while three sensor/heater zones 16" are shown in FIG. 5, the sensor system 20" could be configured to include any number of sensor/heater zones.

Figure 6:
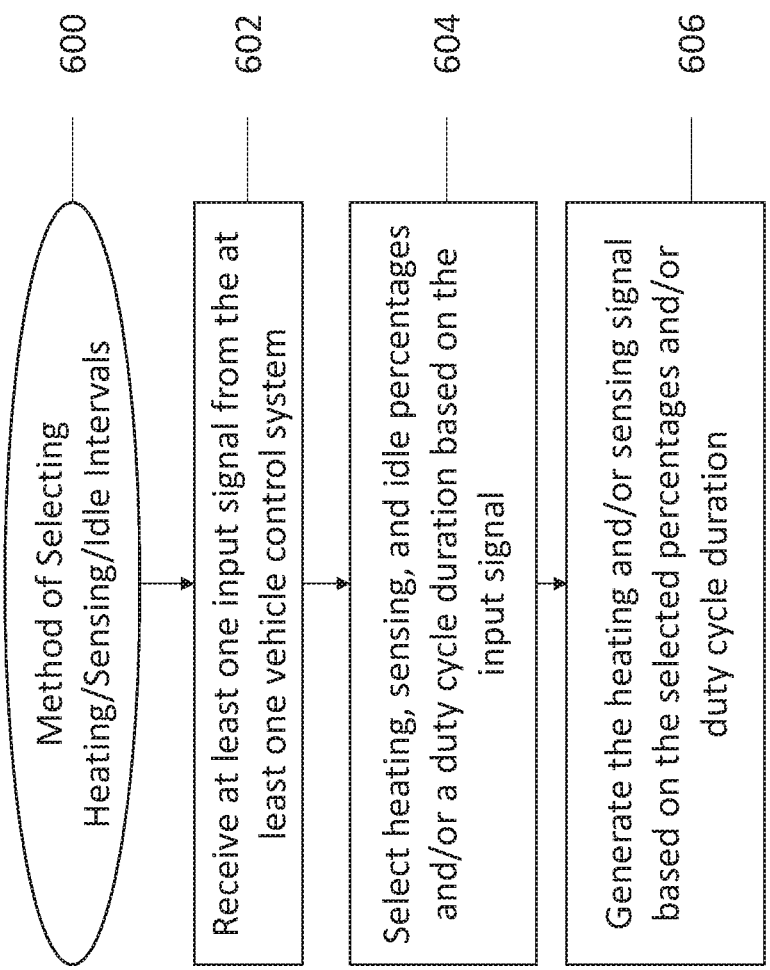
FIG. 6 is a flow chart of selecting a duty cycle duration and/or percentages for generating a heating signal, generating and measuring a sensing signal and reporting the sensing signal measured, and/or being idle, according to one implementation.

With any of the above described systems 20, 20', 20", the processor 22, 22', 22" is in electrical communication with a memory, the electrode 18, 18', 18", and at least one vehicle control system 23, 23', 23". The memory stores instructions for controlling the processor 22, 22', 22" such as, for example, instructions configured to implement the flow charts of FIG. 6 and FIG. 7. FIG. 6 illustrates a method of selecting heating, sensing, and idle intervals, which may be executed by the processor 22, 22', 22". The method 600 begins at step 602 with receiving at least one input signal from the at least one vehicle control system 23, 23', 23". Then, at step 604, a heating percentage of a duty cycle for generating the heating signal, a sensing percentage of the duty cycle for generating and measuring the sensing signal and reporting the sensing signal measured, an idle percentage of the duty cycle during which the heating and sensing signal are not generated (e.g., no signal is generated), and/or a duty cycle duration are selected based on the at least one input signal from the at least one vehicle control system 23, 23', 23". The sum of the heating, sensing, and idle percentages is 100% of a defined duty cycle for an overall electrical power signal used to accommodate heating and sensing pursuant to the circuits and computerized control algorithms described herein. The duty cycle of the electric power signal is variable over time for different conditions, as determined, at least in part, by the input signal from the at least one vehicle control system 23, 23', 23". The duration of the duty cycle may be pre-set, selected based on the at least one input signal, or based on a change in and/or duration of the sensing measurement. Then, in step 606, the time that the heating signal is generated and/or the time that the sensing signal is generated and measured and the measurement is reported is based on the selected percentages and/or the duty cycle duration.

The duty cycle is may be considered a time period in which an entire series of various signal magnitudes (including zero magnitude) is completed. The time period (referred to as a "duty cycle duration") is divided into portions during which the processor 22, 22', 22" generates a heating signal (referred to as "heating percentage"), generates and measures a sensing signal and reports the sensing signal (referred to collectively as "sensing percentage"), and/or is idle (referred to as "idle percentage"). The sum of the percentages of the time period for heating, sensing, and being idle is 100%, and each of the heating, sensing, and idle percentages can be between 0% and 100% of the duty cycle duration. The heating signal and the sensing signal may have either the same or different magnitudes appropriate for the conditions at hand, and the idle portion of the duty cycle may be periods of zero magnitude or another constant magnitude that denotes an off. For example, the duty cycle may have a duty cycle duration of between 100 ms and 4 seconds, according to some implementations. Nothing in this disclosure limits the portions of a duty cycle to any particular number, type, or use for a given electric power signal, and the duty cycle may include percentages for additional portions therein having respective magnitudes necessary for a particular purpose.

According to some implementations, the selection of the duty cycle duration and/or the percentages of the duty cycle is based on the measurement of the sensing signal and whether the measurement of the sensing signal received from the electrode 18 indicates a change in presence or absence from the respective sensor/heater zone 16. For example, in certain implementations, the duty cycle duration is decreased and/or the sensing percentage increases in response to the measurement of the sensing signal indicating a change in presence or absence from the sensor/heater zone 16. And, the duty cycle duration increases and/or the heating percentage increases in response to the measurement of the sensing signal indicating no change in presence or absence from the heater/sensor zone and a temperature of the surface is below a goal temperature.

For example, the sensing signal measured and reported in a subsequent duty cycle from the electrode 18 changes from the sensing signal measured and reported in a previous duty cycle when the occupant's body changes from being present or away from the vehicle component. For example, if an occupant touches and then does not touch the steering wheel (or vice versa) during consecutive duty cycles, the sensing signal measured and reported indicates a change in presence or absence. However, if the occupant continues to touch or continue to not touch the vehicle component during consecutive duty cycles, the sensing signal measured and reported does not indicate a change (or a change greater than a certain threshold to indicate a change in presence or absence) in the sensing signal measured from consecutive duty cycles. In response to detecting a change in the sensing signal measured and reported, the processor selects a shorter duty cycle duration and/or increases the sensing percentage to generate and measure the sensing signal and report the measurement more frequently. When the processor no longer detects a change in the sensing signal measurement, the processor increases the duty cycle duration and/or decreases the sensing percentage.

Figure 7:
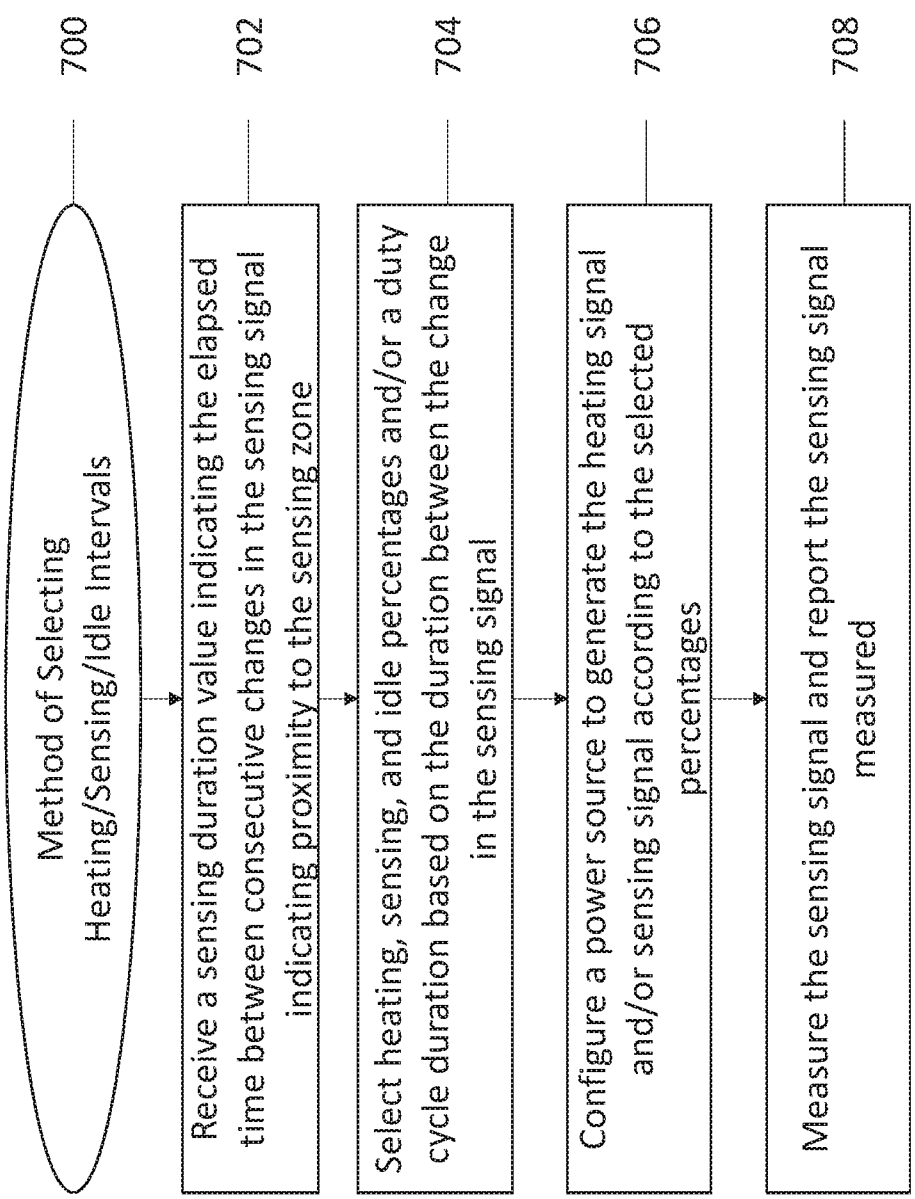
FIG. 7 is a flow chart of selecting a duty cycle duration and/or percentages for generating a heating signal, generating and measuring a sensing signal and reporting the sensing signal measured, and/or being idle, according to another implementation.
Figure 8:
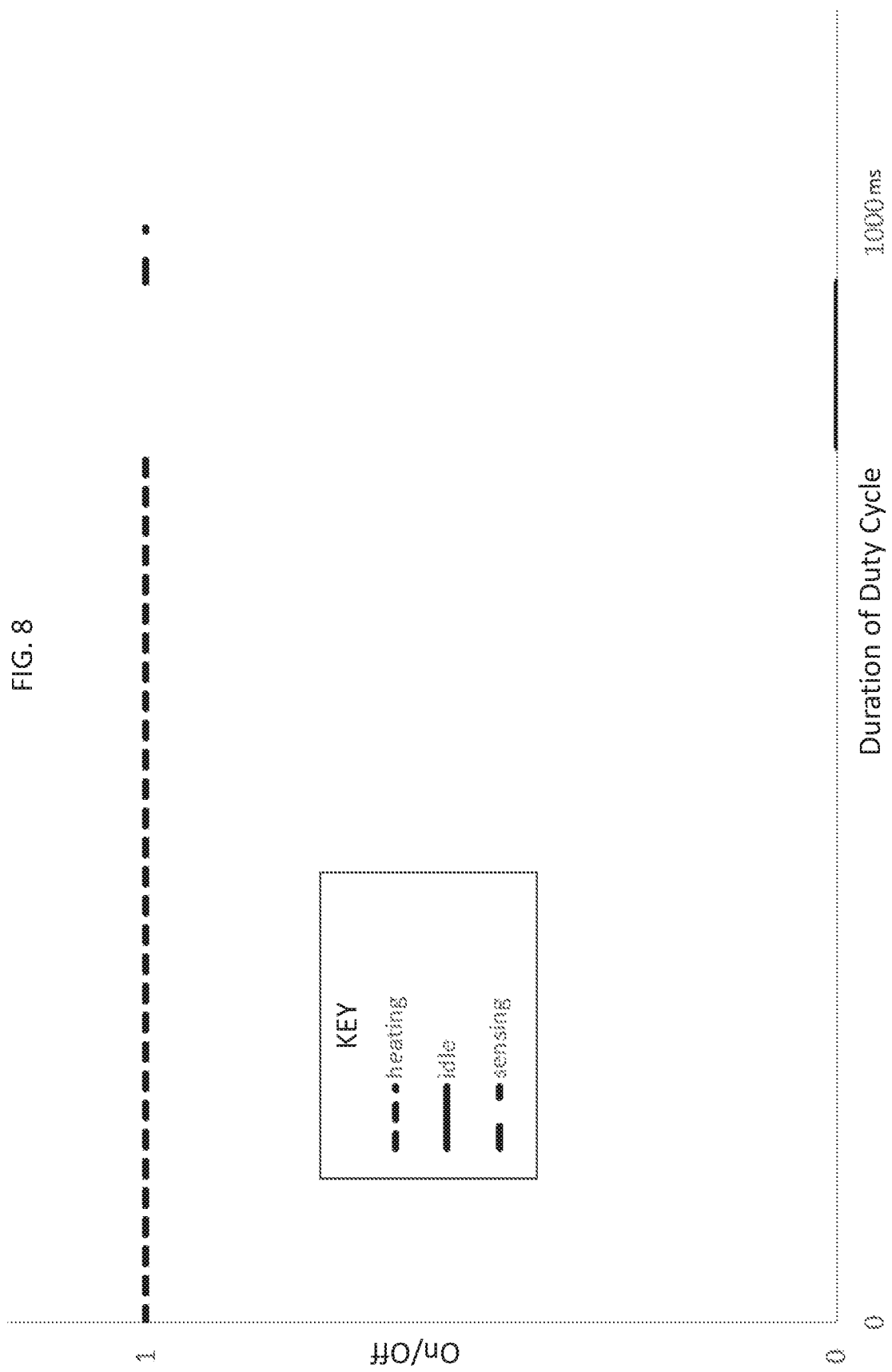
FIGS. 8 and 9 illustrate example duty cycles having different percentages and duty cycle durations, according to various implementations.

In addition, in some implementations, the system selects the heating, sensing, and idle percentages of the duty cycle and/or the duty cycle duration based on the sensing duration value indicating the time elapsed between consecutive changes in the sensing signal measurement that indicates a change in presence or absence. For example, FIG. 7 illustrates a method of selecting heating, sensing, and idle percentages, which may be executed by the processor 22, 22', 22". The method 700 begins at step 702 with receiving a sensing duration value indicating elapsed time between consecutive changes in the sensing signal and indicating proximity to the sensing zone. Then, at step 704, a heating percentage, a sensing percentage, an idle percentage and/or a duty cycle duration are selected based on the sensing duration value. Then, in step 706, the power source is configured for generating the heating signal and/or the sensing signal according to the selected percentages. In step 708, the sensing signal is measured and the measured sensing signal is reported. For example, in some implementations, the heating percentage and/or duty cycle duration increases as the sensing duration value increases. The increase in the sensing duration value indicates more consistent presence or absence, which provides an opportunity to generate the heating signal for a greater time period than when the presence or absence status is changing more frequently. If the sensing duration value reaches a predetermined threshold, the heating percentage may be increased and the sensing percentage and/or idle percentage decreased. The duty cycle duration may be increased also. For example, the heating and sensing percentages may be set at 40% and the idle percentage set to 20% for a 100 ms duty cycle duration during more consistent sensor signal measurements, which indicates a more consistent presence/absence status. These settings result in the generation of the heating signal for 40 ms, generation and measurement of the sensing signal and reporting of the measurement for 40 ms, and no signal generated for 20 ms. Nothing in this or other examples, limits the order of any heating signal, sensing signal, or idle time for any implementation of this disclosure. Also, if the sensing duration value between the change in sensor signal measurements reaches or crosses the predetermined threshold, the heating percentage may be increased to 80%, the sensing percentage decreased to 5%, and the idle percentage is decreased to 15%, and the duty cycle duration is increased to 1 second, which is shown in FIG. 8.

In addition, the predetermined threshold, relative percentages, and/or duty cycle durations can be set at installation or thereafter. In this implementation, the predetermined threshold is a time-based threshold (such as milliseconds, seconds, minutes, etc.). However, in other implementations, the predetermined threshold may be a level of the sensing signal (e.g., occupant detection coupling to ground) or an amount of change (delta) in the level of the sensing signal.

Figure 9:
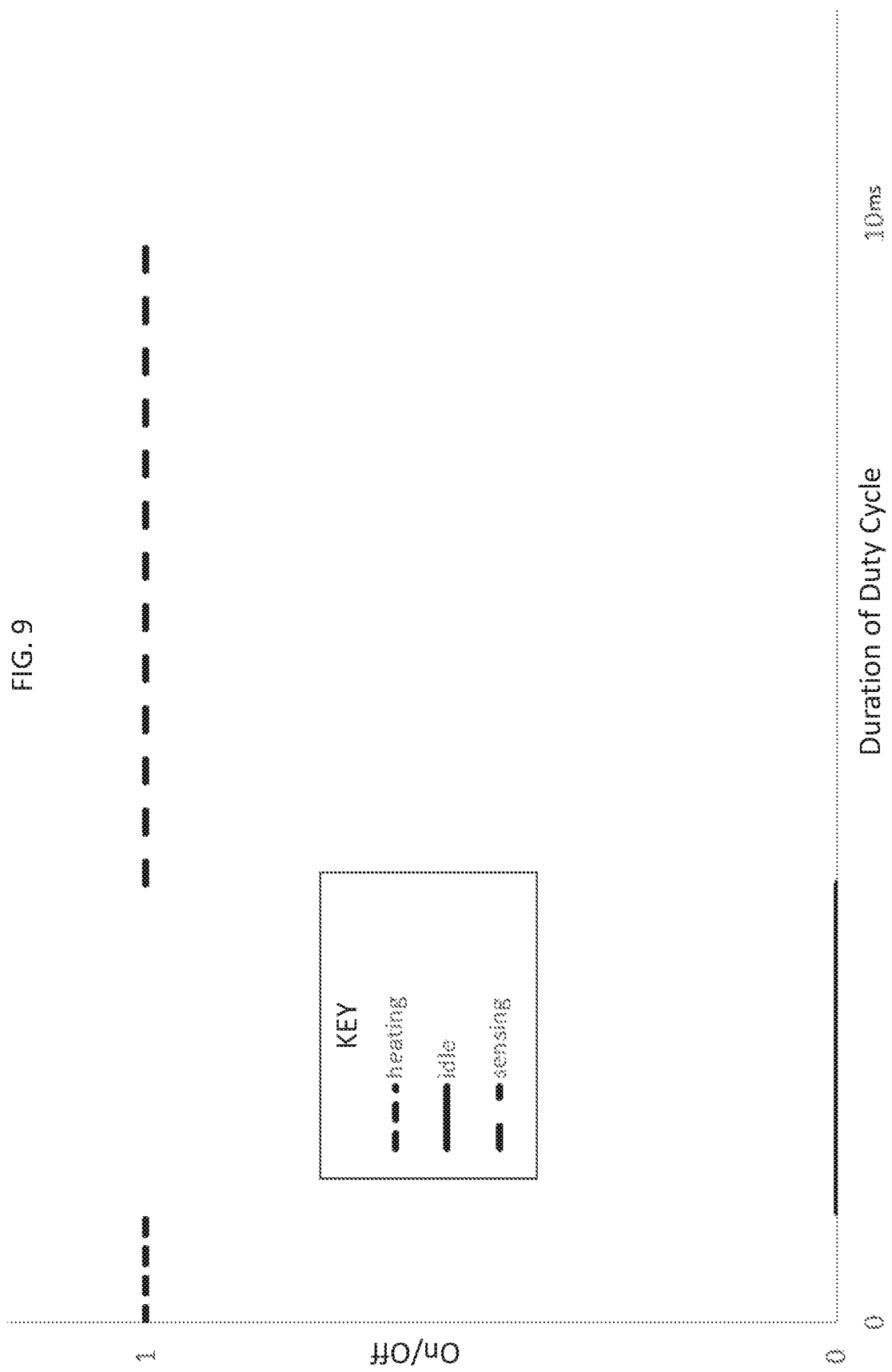

As another example, in some implementations, the heating percentage decreases as a temperature of the surface of the vehicle component increases. For example, in some implementations, the heating percentage is higher than the sensing and/or idle percentages when the at least one input received from the at least one vehicle control system indicates that an occupant is adjacent the sensor/heater zone 16 and a temperature of the surface of the vehicle component is below a threshold temperature. For example, the heating percentage may be 90%, the sensing percentage 10%, and the idle percentage 0% under these conditions. Under this scenario, for a duty cycle duration of 1 second, the processor generates a heating signal for 900 ms and generates and measures a sensing signal and reports the measurement for 100 ms of the duty cycle. For a duty cycle duration of 4 seconds, the processor generates a heating signal for 3600 ms and generates and measures a sensing signal and reports the measurement for 400 ms of the duty cycle. And, as another example, as shown in FIG. 9, the duty cycle duration is decreased to 10 ms, the sensing percentage is set to 60%, the idle percentage is set to 30%, and the heating percentage is set to 10%. In the duty cycle shown in FIG. 9, the sensing signal is generated first, then no signal is generated, then the heating signal is generated. However, in other implementations, the order in which the heating and sensing signals are generated and the idle time within the duty cycle duration may be different. As the temperature of the surface of the vehicle component increases to be above the threshold temperature (but below a goal temperature), the heating percentage decreases. The threshold temperature is less than the goal temperature, and the goal temperature is the temperature that the vehicle component is intended to reach. Once the goal temperature is reached, the heating percentage and idle percentage may be set to 0% and the sensing percentage may be set to 100%. As another example, the heating percentage may be set to 0%, and the sensing and idle percentages may be set to between 0% and 100% (e.g., 80% sensing and 20% idle, or 100% sensing and 0% idle).

In additional or further implementations, the heating, sensing, and/or idle percentages and/or duration of the duty cycle are selected based on a rate of heating goal for the surface of the vehicle component. A rate of heating goal indicates the change in temperature over time expected for the vehicle component and/or the maximum time expected for the vehicle component to reach the goal temperature. In some implementations, the heating percentage decreases as the temperature of the surface of the vehicle component approaches the threshold and/or goal temperatures. For example, in some implementations, the percentages selected allow the system to generate the heating signal sufficiently to heat the vehicle component to the goal temperature within the maximum time expected.

The relative percentages of the duty cycle and/or the duty cycle duration may be selected based on secondary input received by the processor from various vehicle control systems. For example, inputs that may result in an increase in the sensing percentage or the duty cycle duration may include an input indicating that an occupant has entered or is within the vehicle cabin. For example, the input may include an input indicating a change in a door open/closed condition (e.g., from a door sensor system), an input indicating a change in a seat belt buckled/unbuckled condition (e.g., from a seat belt sensor system), a vehicle speed input that indicates a speed at which the vehicle is traveling (e.g., from a vehicle speed sensor system), an input from an camera-based system indicating occupant presence/absence within the vehicle, an input indicating a change in a steering column position (e.g., from a steering sensor system), an input from an ignition switch indicating a change in an ignition switch condition (e.g., changing among an on condition, an off condition, an accessory mode condition, or a crank condition), an input indicating a change in seat position (e.g., from a seat position sensing system), an input indicating depression of a brake pedal (e.g., from a brake pedal sensor system), an input indicating that the vehicle is in autonomous or semi-autonomous driving mode (e.g., from an operation mode system), an input that a parking assist system has been activated, input from vehicle to vehicle (V2V) communication system, or an input from a Vehicle-to-Infrastructure (V2I) communication system. For situations when at least one input signal comprises an input indicating that the vehicle is in autonomous or semi-autonomous driving mode, it is noted that semi-autonomous or autonomous driving mode indicates a driving state wherein the vehicle operates, at least partially, without requiring certain occupant inputs. For example, semi-autonomous or autonomous driving mode includes operating modes in which the vehicle operates without requiring an occupant to contact the steering wheel, accelerator, brake, and/or components and accessories used to change lanes while driving. For example, semi-autonomous or autonomous driving modes may include SAE levels 1-5 of SAE International Standard J3016.

Implementations of this disclosure further include apparatuses as illustrated in FIG. 10 such as a computer 1000 controlling an electrical power source 1010 and defining a duty cycle for an electrical power signal, the electrical power signal comprising a heating signal, a sensing signal, and an idle period within the duty cycle during which neither a heating signal nor a sensing signal is generated. The computer 1000 is configured to be in a data connection with at least one electrode via communication hardware 1012 connected to the electrical power source and disposed within a sensing zone of a vehicle component and receiving the electrical power signal from the electrical power source, the electrode for generating heat for a surface of the vehicle component within the sensing zone in response to receiving a heating signal and for sensing proximity of a vehicle occupant to the sensing zone in response to receiving a sensing signal. The computer may include or be configured for connecting to a processor in electrical communication with the electrical power source 1010, a memory 1004, the electrode 18, and at least one vehicle control system 1020. The memory stores instructions for controlling the processor, and the instructions causing the processor to: (1) receive a sensing duration value indicating elapsed time between consecutive changes in the sensing signal from the electrode and indicating proximity to the sensing zone; (2) based on the sensing duration value received, select a heating percentage of the duty cycle for generating the heating signal, a sensing percentage of the duty cycle for generating and measuring the sensing signal and reporting the measured sensing signal to the memory, and an idle percentage of the duty cycle during which no heating signal or sensing signal is generated, wherein the sum of the heating, sensing, and idle percentages is 100%; and (3) configure the power source to generate the heating signal and/or the sensing signal according to the selected percentages; and (4) measure the sensing signal and report the sensing signal measured based on the selected percentages.

Other types of inputs that may be used to determine the percentages and/or the duty cycle duration include input indicating a change in a power on/off condition (e.g., battery or engine on/off condition) or input indicating that the power to the vehicle has been turned on or off remotely (e.g., from a remote power on/off system). The inputs may be tailored for any type of vehicle, regardless of the type of propulsion system, such as internal combustion engine (ICE) cars, electric cars, and combinations thereof.

As another example, the heating percentage and/or the duty cycle duration may be increased in response to receiving input that indicates sensing is not a critical task and heating can take priority, such as when the vehicle is stationary, when the speed of the vehicle is less than a threshold speed, when the temperature of a heated vehicle component or when the interior temperature of the vehicle is below a threshold temperature, or when the operator is not detected to be within the vehicle. For example, if the input from the vehicle control system indicates that the power has been started remotely and no input has been received indicating that the occupant has entered the vehicle, the heating percentage of the duty cycle for generating the heating signal provided to each electrode 18 in the steering wheel 12 may be selected to be 100% since no sensing function is needed. When an occupant enters the vehicle, as indicated by input from another vehicle control system, the processor decreases the heating percentage to allow the system to sense if/when the occupant touches the steering wheel 12.

In addition, the electrodes 18 may be disposed on a substrate, such as a mat. The electrodes may be disposed on the same or different sides of the substrate, according to some implementations. Furthermore, in some implementations, the system 20 may further include a shielding electrode disposed between the electrode 18 for the sensor/heater zone and a frame of the vehicle component. The shielding electrode is in electrical communication with the processor, and the instructions cause the processor to generate a shielding signal for communicating to the shielding electrode. The shielding signal prevents parasitic capacitance between the electrode 18 and the frame of the vehicle component.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example implementations, however persons skilled in the art will recognize that changes may be made in form and detail without departing from the spirit and scope of the disclosed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is complex, not all changes in the technology are foreseeable. The present disclosure described with reference to the example implementations is manifestly intended to be as broad as possible. For example, unless specifically otherwise noted, the example implementations reciting a single particular element also encompass a plurality of such particular elements.

Example implementations may include program products comprising computer or machine-readable media for carrying or having machine-executable instructions or data structures stored thereon. For example, the sensors and heating elements may be computer driven. Example implementations illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other example implementations is illustrative only. Although only a certain number of implementations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative implementations. Other substitutions, modifications, changes and omissions may be made in the design, operating conditions and arrangement of the preferred and other example implementations without departing from the spirit of the present subject matter.

The invention claimed is:

1. A vehicle component heating system comprising:
a computer controlling an electrical power source defining a duty cycle for an electrical power signal, the electrical power signal comprising a heating signal, a sensing signal, and an idle period within the duty cycle during which neither a heating signal nor a sensing signal is generated;
at least one electrode connected to the electrical power source and disposed within a sensing zone of a vehicle component, the electrode for generating heat for a surface of the vehicle component within the sensing zone in response to receiving the heating signal and for sensing proximity of a vehicle occupant to the sensing zone in response to receiving the sensing signal, wherein the at least one electrode is a first electrode and the system further comprises a second electrode disposed between the first electrode and a portion of the vehicle component, the second electrode receiving a shielding signal for reducing parasitic capacitance between the first electrode and the portion of the vehicle component;
a processor connected to the computer and in electrical communication with a memory, the memory storing instructions for controlling the processor, the instructions causing the processor and the electrical power source to control the duty cycle of the electrical power signal, wherein the processor performs the following steps with the instructions;
receive at least one input signal from the at least one vehicle control system;
based on the at least one input signal from the at least one vehicle control system, select a heating percentage of the duty cycle for generating the heating signal, a sensing percentage of the duty cycle for generating and measuring the sensing signal and reporting the sensing signal measured, and an idle percentage of the duty cycle during which no heating signal or sensing signal is generated, wherein a sum of the heating, sensing, and idle percentages is 100%; and
generate the heating signal and/or generate and measure the sensing signal and report the sensing signal measured based on the selected percentages; and
applying the electrical signal to the second electrode as the shielding signal, the electrical signal having the respective heating percentage, sensing percentage, and idle percentage of the duty cycle.

2. The vehicle component heating system of claim 1, wherein the instructions further cause the processor to select a duty cycle duration based on the at least one input signal from the at least one vehicle control system, and generating the heating signal and/or generating and measuring the sensing signal and reporting the sensing signal measured is further based on the selected duty cycle duration.

3. The vehicle component heating system of claim 2, wherein the selection of the duty cycle duration and/or the heating, sensing, and idle percentages of the duty cycle are based on whether the reported sensing signal measurement indicates a change in presence or absence from the sensing zone.

4. The vehicle component heating system of claim 3, wherein the duty cycle duration decreases and/or the sensing percentage increases in response to the reported sensing signal measurement indicating the change in presence or absence from the sensing zone.

5. The vehicle component heating system of claim 3, wherein the duty cycle duration increases and/or the heating percentage increases in response to the reported sensing signal measurement indicating no change in presence or absence from the sensing zone and a temperature of the surface is below a goal temperature.

6. The vehicle component heating system of claim 1, wherein the heating percentage decreases as a temperature of the surface of the vehicle component increases.

7. The vehicle component heating system of claim 1, wherein the heating percentage is higher than the sensing percentage in response to the at least one input signal received from the at least one vehicle control system indicating that an occupant is adjacent the sensing zone and a temperature of the surface of the vehicle component is below a threshold temperature.

8. The vehicle component heating system of claim 7, wherein the heating percentage decreases as the temperature of the surface of the vehicle component approaches the threshold temperature.

9. The vehicle component heating system of claim 1, wherein the heating percentage is lower than the sensing percentage in response to the at least One input signal received from the at least one vehicle control system indicating that an occupant is adjacent the sensing zone and a temperature of the surface of the vehicle component is at or above a threshold temperature and below a goal temperature, the threshold temperature being less than the goal temperature.

10. The vehicle component heating system of claim 1, wherein the first electrode and the second electrode are disposed in a steering wheel.

11. The vehicle component heating system of claim 1, wherein the first electrode and the second electrode are disposed in a seat.

12. The vehicle component heating system of claim 1, wherein the first and second electrodes are disposed on a surface of a substrate.

13. A vehicle component heating system comprising:
a computer controlling an electrical power source defining a duty cycle for an electrical power signal, the electrical power signal comprising a heating signal, a sensing signal, and an idle period within the duty cycle during which no signal is generated;
at least one electrode connected to the electrical power source and disposed within a sensing zone of a vehicle component and receiving the electrical power signal from the electrical power source; the electrode for generating heat for a surface of the vehicle component within the sensing zone in response to receiving a heating signal and for sensing proximity of a vehicle occupant to the sensing zone in response to receiving a sensing signal, wherein the at least one electrode is a first electrode and the system further comprises a second electrode disposed between the first electrode and a frame of the vehicle component, the second electrode receiving a shielding signal for reducing parasitic capacitance between the first electrode and the frame of the vehicle;
a processor connected to the computer and in electrical communication with a memory, the memory storing instructions for controlling the processor, the instructions causing the processor and the electrical power source to control the duty cycle of the electrical power signal, wherein the processor performs the following steps in the instructions:
receive a sensing duration value indicating elapsed time between consecutive changes in the sensing signal from the electrode and indicating proximity to the sensing zone;
based on the sensing duration value received, select a heating percentage of the duty cycle for generating the heating signal, a sensing percentage of the duty cycle for generating and measuring the sensing signal and reporting the measured sensing signal to the memory, and an idle percentage of the duty cycle during which no signal is generated, wherein the sum of the heating, sensing, and idle percentages is 100%; and
configure the power source to generate the heating signal and/or the sensing signal according to the selected percentages; and
measure the sensing signal and report the sensing signal measured; and
generate the shielding signal with the electrical signal having the respective heating percentage sensing percentage and idle percentage of the duty cycle to form multiple driven shield signal levels;
applying the multiple driven shield signal levels to the shield electrode.

14. The vehicle component heating system of claim 13, wherein the instructions further cause the processor to select a duty cycle duration based on the sensing duration value indicating time elapsed between consecutive changes in the reported sensing signal measuring proximity to the sensing zone, and the heating, sensing, and idle percentages are further based on the selected duty cycle duration.

15. The vehicle component heating system of claim 14, wherein the selection of the duration and/or the percentages of the duty cycle are based on whether the reported sensing signal measurement indicates a change in presence or absence from the sensing zone.

16. The vehicle component heating system of claim 14, wherein the duty cycle duration decreases and/or the sensing percentage increases in response to the reported sensing signal measurement indicating the change in presence or absence from the sensing zone.

17. The vehicle component heating system of claim 16, wherein the duty cycle duration increases and/or the heating percentage increases in response to the reported sensing signal measurement indicating no change in presence or absence from the sensing zone and a temperature of the surface is below a goal temperature.

18. The vehicle component heating system of claim 16, wherein the heating and sensing percentages and/or duty cycle duration are selected based on a rate of heating goal for the surface of the vehicle component.

* * * * *